Aug. 28, 1956
R. J. FRITZ ET AL
2,760,911
FLUID HYDROFORMING PROCESS
Filed Dec. 26, 1951
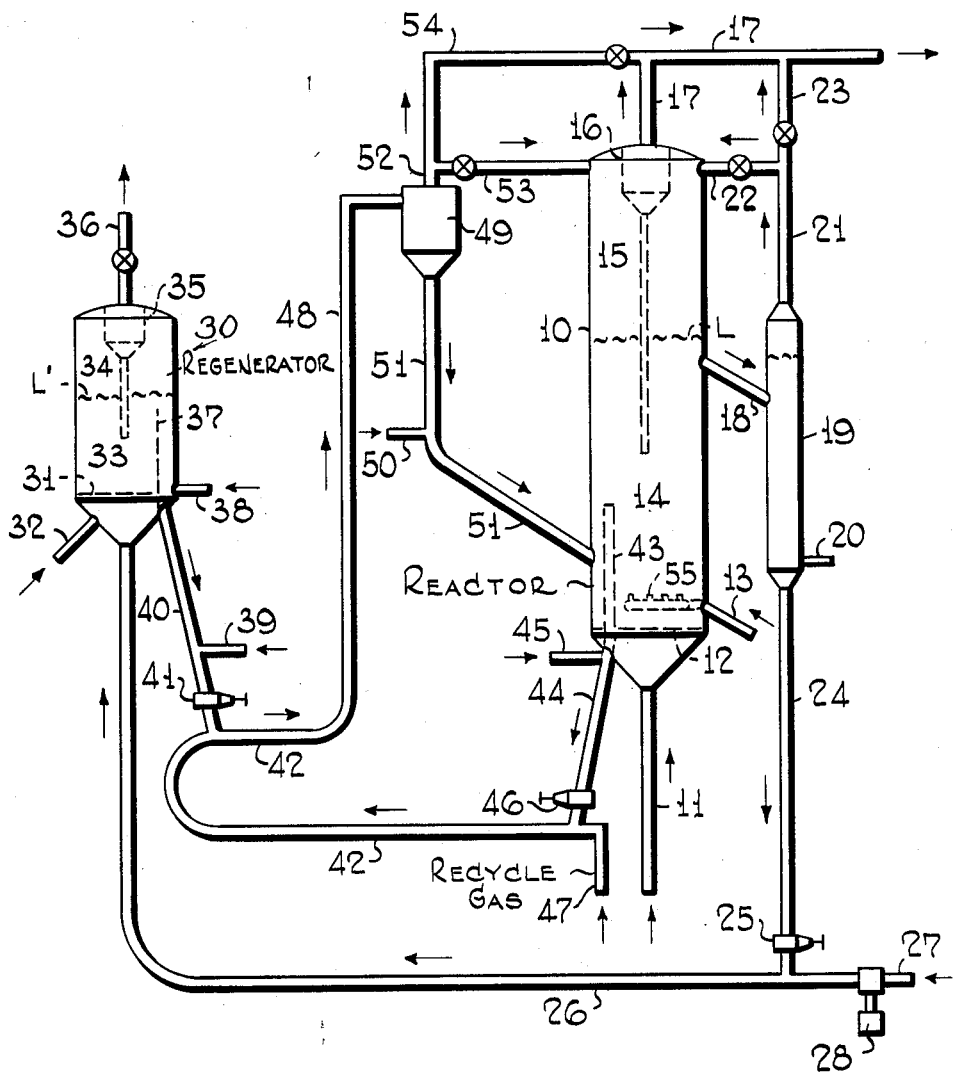
Robert J. Fritz
John F. Moser, Jr.
Lloyd A. Nicolai
Edward W. S. Nicholson   Inventors
Walter A. Rex
By J. Cashman Attorney

United States Patent Office 2,760,911
Patented Aug. 28, 1956

2,760,911

FLUID HYDROFORMING PROCESS

Robert J. Fritz, John F. Moser, Jr., Lloyd A. Nicolai, and Edward W. S. Nicholson, Baton Rouge, La., and Walter A. Rex, Westfield, N. J., assignors to Esso Research and Engineering Company, a corporation of Delaware Application December 26, 1951, Serial No. 263,445

8 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750°–1150° F. in the pressure range of about 50–1000 lbs. per sq. inch and in contact with such catalysts as molybdenum oxide, chromium oxide or, in general, oxides or sulfides of metals of Groups IV, V, VI, VII, and VIII of the Periodic System of elements, alone, or generally supported on a base or spacing agent such as alumina gel, precipitated alumina or zinc aluminate spinel. A good hydroforming catalyst is one containing about 10 wt. per cent molybdenum oxide supported on alumina or upon zinc aluminate spinel.

It has been proposed in application Serial No. 188,236, filed October 3, 1950, now Patent No. 2,689,823 to effect the hydroforming of naphtha fractions in a fluidized solids reactor system in which naphtha vapors are passed continuously through a dense fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels and equipment can be designed for single rather than dual function, (3) the reactor temperature is substantially constant throughout the fluidized catalyst bed, and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatment involving at least a partial reduction of higher oxides of the catalytic metal formed during regeneration to a lower or more catalytically active form of catalytic metal oxide during its passage through the transfer line into the reaction zone. In view of the high temperature of the regenerated catalyst (1050°–1300° F.) and the exothermic character of the reaction between the hot, freshly regenerated catalyst and the hydrogen it is necessary to make the transfer line very short and of small diameter in order to keep the time of contact of the catalyst and hydrogen-containing gas sufficiently short to avoid overtreatment and/or thermal degradation of the catalyst.

It is the object of this invention to provide a novel method for treating freshly regenerated hydroforming catalyst preparatory to recycling the same to a fluidized solids hydroforming reaction zone.

It is a further object of this invention to provide a novel method of treating the freshly regenerated hydroforming catalyst at low temperatures for relatively long periods of time.

It is also an object of this invention to provide a novel method for treating freshly regenerated hydroforming catalyst at low temperatures for long periods of time while causing the gaseous products from the pretreatment to by-pass the main reactor bed.

These and other objects will appear more clearly from the detailed specification and claims which follow:

It has now been found that hot, freshly regenerated hydroforming catalyst can be most advantageously pretreated with a hydrogen-containing gas to convert higher catalytic metal oxides formed during regeneration to a lower or more catalytically active form of catalytic metal oxide if the hot regenerated catalyst is intermixed with a stream of recycle reactor catalyst before or at the same time that hydrogen-rich gas is first brought into contact with the regenerated catalyst, and the gaseous products from the pretreatment, principally the water formed by the reduction of the catalytic metal oxide, are by-passed around the reactor bed. In this manner contact of the freshly regenerated catalyst with hydrogen-rich gas can be effected at lower temperatures for periods as long as 15 minutes or more without overtreatment and/or thermal degradation of the catalyst while at the same time heat formed in the regenerator is effectively transferred to the reactor side by transfer of the sensible heat of the regenerated catalyst to the recycle reactor catalyst. By discharging the gaseous products from the pretreatment into the dilute phase in the reactor or into the products outlet line from the reactor, contact of the water vapor formed in the pretreating operation with the main reactor catalyst bed is avoided thereby avoiding the deleterious effects of water vapor upon the catalyst under hydroforming reaction conditions.

Reference is made to the accompanying drawing illustrating a schematic flow plan in accordance with the present invention.

In the drawing 10 is a reactor vessel provided at the bottom with an inlet line 11 for the introduction of hot, hydrogen-rich or recycle gas. A perforated plate or grid 12 is preferably arranged near the bottom of the vessel in order to insure uniform distribution of the incoming recycle gas over the entire cross section of the reactor vessel. A separate inlet 13 is shown for the introduction of the naphtha feed to a distributor ring 55 above the grid member 12 although the feed may, if desired, be introduced separately or in admixture with the recycle gas below the grid.

The reactor vessel 10 is charged with finely divided hydroforming catalyst particles and the superficial velocity of the vapors and gases through the reactor vessel 10 is so controlled as to form a dense, fluidized, turbulent bed 14 of catalyst and vapors having a definite level L superposed by a dilute or disperse phase 15 comprising small amounts of catalyst entrained in the vaporous reaction products. The reaction products are taken overhead from the reactor, preferably through a cyclone separator 16 or the like for separating entrained catalyst particles which are returned to the dense bed 14 via a dip leg attached to the bottom of the cyclone separator. Reaction products are taken overhead through outlet line 17 and conducted to suitable fractionating, pressure release, or other processing equipment and then to storage.

Catalyst particles are continuously withdrawn from the dense bed 14 through withdrawal conduit 18 into an external stripper 19. It will be understood that the stripper could also be arranged within the reactor vessel as by providing a vertical conduit or cell, preferably extending above level L and provided with an orifice or port below dense bed level L for controlling the discharge of catalyst directly from dense bed 14 into the conduit or stripper cell. A tap 20 is provided at the lower portion of the stripper for introducing a suitable stripping gas such as steam, nitrogen, or the like which will serve to remove entrained or adsorbed hydrogen or hydrocarbon materials that would otherwise be carried to the regeneration zone and burned therein. The stripping gas and stripped gases pass overhead from stripper 19 through line 21 and into the upper part of the reactor vessel 10 through line 22 in the event that substantial amounts of catalyst are entrained in the stripping gas and recovery thereof in reactor cyclone separator 16 is desired, or through line 23 into product outlet line 17 in the event that it is desired to have the stripping gas bypass the reactor. The lower end of the stripping vessel is necked down and attached to conduit 24 and forms therewith a standpipe for developing sufficient fluistatic pressure to assist in the transfer of stripped spent catalyst to the regenerator vessel. A slide valve 25 or the like is provided near the base of the standpipe 24 to control the withdrawal of catalyst from the reactor vessel. If desired or necessary, one or more gas taps can be provided along standpipe 24 to supply fluidizing gas thereto.

The stripped spent catalyst is discharged from the base of the standpipe 24 into transfer line 26 where it is picked up by a stream of regeneration gas or air supplied through line 27 and compressor 28 and conveyed into the bottom of regenerator vessel 30. A perforated plate or grid member 31 is preferably arranged in the bottom of the regenerator to insure uniform distribution of the catalyst and gases over the entire cross-section of the regenerator. In order to avoid overtreatment of the catalyst in transfer line 25 it is preferable to use only part of the air necessary for the regeneration for conveying the spent catalyst through the transfer line 26 and to add the remainder of the air necessary for regeneration through a separate line 32 or additional lines discharging directly into the regenerator 30.

The superficial velocity of the regeneration gases through regenerator 30 is so controlled as to form a dense fluidized, turbulent bed 33 of catalyst particles and gas having a definite level L' which is superposed by a dilute or disperse phase 34 in the upper part of the regenerator 30 comprising small amounts of catalyst entrained in the regeneration gases. The regeneration gases are taken overhead from regenerator 30, preferably after passage through a cyclone separator 35 or the like which serves to remove most of the catalyst particles from the regeneration gases. The catalyst particles are returned to the dense bed 33 through the dip pipe attached to the bottom of the cyclone separator. The regeneration gases, substantially free from catalyst particles, are withdrawn overhead through line 36 which is provided with a pressure control valve and passed to a waste gas stack or to suitable washing and storage equipment in the event that it is desired to use the regeneration gases for stripping purposes. In view of the fact that the oxidative reactions that occur in the regenerator generate more heat than can normally be transferred to the reactor by the circulating catalyst at low catalyst to oil ratios without exceeding safe temperature limits, it is ordinarily necessary to provide cooling coils in the regenerator. A very desirable arrangement is to provide a primary cooling coil entirely below the level L' and a secondary cooling coil partly below and partly above the dense bed level L' to permit adjustment of the heat transfer capacity by simply varying the dense bed level L' in the regenerator.

Regenerated catalyst overflows from dense bed 33 into a stripping cell formed by conduit 37. The conduit 37 may, if desired be extended upwardly above dense bed level L' and an orifice or port may be provided in the wall of the conduit below the level L' of the dense bed 33 for withdrawal of catalyst directly from the dense bed, or the stripper may be arranged externally of the regenerator vessel 30 with a connector pipe for discharging catalyst from the dense bed into the stripper and with an outlet line connected to the top of the stripper for discharging stripping gas and stripped constituents into the dilute phase 34 in the upper part of regenerator 30 or into outlet line 36.

A stripping gas is introduced into the stripper cell at 38 and, if desired, further amounts of stripping gas may be introduced at 39. Suitable stripping gases are air, nitrogen or flue gas, or mixtures of these. It is preferred to introduce air at 38 to strip and/or effect a final clean up of the regenerated catalyst and then to purge the stream of regenerated catalyst of any residual air or carbon oxides by introducing a small amount of nitrogen at 39. If flue gas is used for stripping the regenerated catalyst it is preferred to wash it free of carbon monoxide and carbon dioxide since it is advisable to exclude these gases from the reaction zone.

The bottom of conduit 37 is connected to conduit 40 and forms therewith a standpipe for facilitating the transfer of regenerated catalyst to the reactor. A slide valve 41 or the like is arranged near the base of the standpipe in order to control the discharge of stripped regenerated catalyst into transfer line 42.

A conduit 43 extends upwardly from the bottom of reactor vessel 10 through distributor grid 12 into the lower portion of dense bed 14. Catalyst flows from the reactor dense bed 14 into the upper end of conduit 43 and passes downwardly therethrough into conduit 44 countercurrent to a stream of recycle gas introduced at line 45. Conduits 43 and 44 form a standpipe for facilitating the circulation of a stream of recycle reactor catalyst. A slide valve 46 or the like is arranged near the base of the standpipe for controlling the discharge of recycle reactor catalyst into transfer line 42. A stream of hydrogen-rich recycle gas is supplied through line 47 to convey the recycle reactor catalyst through transfer line 42 and to mix the recycle reactor catalyst with the freshly regenerated catalyst discharged from standpipe 40 into the transfer line 42. The mixture of regenerated catalyst and recycle reactor catalyst passes through riser 48 into a cyclone separator 49 or the like for separating the hydrogen-containing or pretreating gas from the mixture of recycle reactor catalyst and freshly regenerated catalyst. Additional inlet lines may be provided along transfer line 42 and riser 48 for the introduction of further amounts of hydrogen-rich gas to effect transfer of the catalyst particles as well as the pretreatment or partial reduction of the freshly regenerated catalyst. The riser 48 may ordinarily be designed to give adequate contact between regenerated catalyst and hydrogen-rich gas. If desired, however, additional hydrogen-rich or recycle gas may be introduced at 50 in order to effect further pretreatment of the catalyst prior to recycling or discharging the same into reactor vessel 10 through standpipe transfer line 51.

The gaseous products from the pretreatment, principally the water vapor formed by the reduction of the catalytic metal oxide is taken overhead from the pretreating section as through outlet line 52 connected to the top of cyclone separator 49 and is discharged either through line 53 into the upper part of reactor vessel 10 or through line 54 into product outlet line 17 from the reactor in the event that it is desired to completely exclude the pretreating vapors from the reactor vessel.

In the arrangement as described above it may be seen that the present invention permits the intermixing of a stream of recycle reactor catalyst at essentially reactor temperature with a stream of hot, freshly regenerated catalyst in order to effectively reduce the temperature of the regenerated catalyst to a sufficiently low point to permit pretreatment of the regenerated catalyst without danger of overtreatment and/or thermal degradation while still permitting the catalyst particles to transfer heat from the regenerator to the reactor side. In addition the present invention prevents water vapor formed in the pretreatment of the regenerated catalyst from coming into contact with the main dense bed in the reactor zone.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degration of the feed stock. Ordinarily preheating of the feed stock is carried out to temperatures of about 800°–1050° F., preferably about 1000° F. The naphtha preheat should be as high as possible while avoiding thermal degredation thereof as by limiting the time of residence in the transfer or feed inlet lines. The preheated feed stock may be supplied to the reaction vessel in admixture with hydrogen-rich recycle gas or it may be introduced separately as shown. The recycle gas, which contains from about 50 to 80 vol. per cent hydrogen is preheated to temperatures of about 1150°–1300° F., preferably about 1200° F. prior to the introduction thereof into inlet line 11. The major proportion (at least 85%) of the recycle gas is introduced directly into the bottom of reactor vessel 10 while a minor proportion only (at most about 15%) is introduced into the reactor catalyst recycle line or into the riser line 48. The recycle gas should be circulated through the reactor at a rate of from about 1000 to 8000, preferably about 4000 cu. ft. per bbl. of naphtha feed. The amount of recycle gas should in general be the minimum amount that will suffice to introduce the necessary portion of the heat of reaction and maintain the amount of carbon formed at a low level.

The reactor system is charged with a mass of finely divided hydroforming catalyst particles. Suitable catalysts include Group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. % molybdenum oxide or from about 10 to 40 wt. % chromium oxide upon a suitable carrier. If desired minor amounts of stabilizers and promoters such as silica, calcium oxide, ceria or potassia can be included in the catalyst. The catalyst particles are, for the most part between 200 and 400 mesh in size or about 0–200 microns in diameter with a major proportion between 20 and 80 microns.

The hydroforming reactor vessel should be operated at temperatures between about 850° F. and 950° F., preferably about 900° F. and at pressures between 50 and 500 lbs. per sq. inch, preferably about 200 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch generally results in increased carbon formation which in most cases becomes excessive below about 75 lbs. per sq. inch. Above 200 lbs., however, catalyst selectivity to light products ($C_4$'s and lighter) increases rapidly. The regenerator is operated at essentially the same pressure as the reactor and at temperatures of from 1050°–1300° F. The residence time of the catalyst in the reactor is of the order of about 1 to 4 hours and in the regenerator about 5 to 15 minutes or more. The residence time of the regenerator catalyst in contact with hydrogen-containing gas prior to reintroduction into the reactor may vary from about 2–3 seconds to 15 minutes or more. The amount of recycle reactor catalyst added to the stream of regenerated catalyst should suffice to yield a mixture of catalyst having a temperature below about 1050° F.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat higher weight ratios can be used at higher pressures.

Space velocity of the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt. The superficial velocity of the gaseous and/or vaporous materials through the reactor and regenerator is ordinarily between about 0.2 and 0.9 ft. per second.

EXAMPLE 1

In order to determine the effect of temperature on the rate and extent of reduction of molybdena, experiments were carried out at atmospheric pressure in which a molybdena-alumina catalyst and pure $MoO_3$ were contacted with a stream of pure hydrogen at various temperatures for extended periods of time. The data are summarized below.

|  | Temp., °F. | Equivalent Form of Molybdena | |
| --- | --- | --- | --- |
|  |  | After 6 Hrs. | After 40 Hrs. |
| 10% $MoO_3$ on Alumina.[1] | 900 | $Mo_2O_5$ | 70% $Mo_2O_5$+30% $MoO$ |
|  | 1,200 | $Mo_2O$ | $Mo$ |
|  | 900 | $MoO_2$ | $MoO_2$ |
| C. P. $MoO_3$ | 1,000 | $MoO_2$ | $MoO_2$ |
|  | 1,100 | $Mo_2O$ | $Mo$ |

[1] Regenerated at 1,200° F. to convert all molybdenum to $MoO_3$ prior to reduction.

These experiments show that the $MoO_3$ on the alumina base is less easily reduced than the pure $MoO_3$ (unsupported). At normal reaction temperatures for hydroforming (about 900° F.), it requires an exceedingly long time to reduce the molybdenum on the catalyst significantly below an equivalent oxidation state of $Mo_2O_5$. At temperatures up to almost 1100° F., the pure unsupported molybdenum can be easily reduced in $H_2$ below $Mo_2O_5$ but not below $MoO_2$. At the high temperatures of 1100°–1200° F. desirable in a commercial fluid hydroforming operation from the standpoint of simplicity of equipment, and, hence, of economics, the molybdenum can be readily reduced below $MoO_2$ and even to metallic molybdenum. This is representative of over-pretreatment, and poor catalyst activity results.

The results of over-pretreatment in relation to catalyst activity and selectivity may be seen from the following experiments carried out on a continuous 50 B./D. fluid hydroforming pilot plant with a 10% $MoO_3$ on alumina catalyst and feeding a 200°–350° F. virgin Louisiana naphtha at 900° F., 200 p. s. i. g., 0.2 w./hr./w., 1 C/O, 4000 CF/B, with complete regeneration of the catalyst.

| 50 B./D. Unit Run No. | 6C-1 | 6D-1 | 6E-1 | 6B-1 |
|---|---|---|---|---|
| Pretreating Temp., °F | 1,000 | 1,100 | 1,160 | 1,150 |
| Pretreating Time, Sec. | 2-3 | 2-3 | 2-3 | 60-90 |
| Valence State [1] of Reactor Catalyst | 4.9 | 4.7 | 4.7 | 4.5 |
| CFR-R Clear O. N. of $C_5$-430° F. Gasoline Produced | 97.4 | 94.1 | 94.0 | 87.4 |
| Yield of $C_5$-430° F. Gasoline at 90 CFR-R Octane No., Vol. Percent | 84 | 82 | 81 | 79.5 |

[1] The valence state is defined as follows: $MoO_3$=valence of 6.0; $Mo_2O_5$=valence of 5.0; $MoO_2$=valence of 4.0. Thus, an average valence state of 4.5 could be made up of equal parts of $MoO_2$ and $Mo_2O_5$. However, the average valence state alone does not give any exact information about the types of oxides present for an average valence state of 4.5 could be represented equally well by 1 part of $MoO_3$ and 3 parts of $MoO_2$.

It is apparent from the above experiments that the more reduced states resulted in poorer catalyst activity and selectivity, and this is probably due to some of the molybdena being reduced, under the more severe reducing conditions, to the very low oxides, or even metallic molybdenum, which have little or no catalytic activity. For maximum catalyst activity, an average valence state close to 5.0 is desirable, and this can readily be controlled by carrying out the pretreatment at low temperatures.

EXAMPLE 2

Additional experiments were carried out in a batch-fluid cyclic hydroforming pilot unit feeding a 200-350° F. virgin Louisiana naphtha over 10% $MoO_3$ on alumina catalyst at 200 p. s. i. g., 900° F., 0.3 w./hr./w., 3000 C.F./B. gas rate, for 4-hour hydroforming periods. The time and temperature of preheating the catalyst before each hydroforming period were varied and the following results were obtained.

| Pretreat Conditions | | Catalyst Activity (Octane No. of Product at 0.3 W./Hr./W.) | Catalyst Selectivity (Yield of 90 CFR-R Octane No. Product Vol. Percent) |
|---|---|---|---|
| Time, Min. | Temp., °F. | | |
| 1 | 900 | 91 | 83 |
| 15 | 900 | 91 | 82 |
| 1 | 1,150 | 89 | 80 |
| 15 | 1,150 | 87 | 79 |

Here again it is shown that both the activity and selectivity of the catalyst are impaired by pretreating at high temperatures for times of the order of one minute or more, and the longer the time at high temperatures, the poorer the results. On the other hand, extending the time of pretreating at low temperatures to as much as 15 minutes has no appreciable effect on the catalyst.

Thus, it is seen from the above-described experiments that carrying out catalyst pretreatment at low temperatures insures optimum catalyst activity and selectivity, and eliminates the necessity for critical and difficult control over the time of pretreatment.

EXAMPLE 3

The adverse effect on the hydroforming catalyst of the water formed during pretreatment may be shown by the following data which were obtained by continuously passing controlled amounts of $H_2O$ into a batch-fluid reactor with the inlet $H_2$ during a hydroforming period. The equivalent amount of water produced by pretreatment in two-vessel continuous fluid hydroforming is given as a function of the C/O ratio. In the pretreatment of molybdena-containing catalysts, the reduction normally proceeds from a Mo valence of 6 to 5, thus producing 1 mol of $H_2O$ for every two mols of $MoO_3$ reduced.

*Operating conditions*

[200-350° F. virgin naphtha, molybdena on alumina catalyst 900° F., 200 p. s. i. g., 0.3 w./hr./w., 4-hr. cycle length 3,000 C. F. of inlet $H_2$ per bbl. of Feed.]

| Water Addition Rate, percent of Inlet $H_2$ | 0 | 1 | 3 | 5 | 10 |
|---|---|---|---|---|---|
| C/O Ratio Equivalent to Above Water Addition Rate [1] | | 0.95 | 2.85 | 4.75 | 9.5 |
| CFR-R Oct. No. of Prod. at 0.3 W./Hr./W. | 92.0 | 91.5 | 90.3 | 89 | 86 |
| Vol. percent Gasoline Yield at 90 CFR-R Oct. No. | 82.5 | 82.0 | 81.2 | 80.2 | 78.0 |
| Wt. percent Carbon at 90 CFR-R Oct. No. | 0.4 | 0.5 | 0.62 | 0.80 | 1.15 |

[1] C/O ratio required to produce the same amount of water of pretreatment as was artificially added to the reactor in these experiments.

It is apparent that as the water content entering the reactor increases the selectivity and activity of the hydroforming operation decrease rapidly. Obviously, as the C/O ratio in fluid hydroforming increases, more water of pretreatment is carried into the reactor and poorer hydroforming results are obtained. Significant improvements can be made in hydroforming, therefore, by not permitting the water formed in the pretreatment to enter the reactor.

The foregoing description contains a limited number of embodiments of the present invention. It will be understood, however, that numerous variations are possible without departing from the scope of the following claims.

What is claimed is:

1. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight ratios of about 0.5 to 1.5, the improvement which comprises continuously withdrawing a stream of catalyst particles from a reaction zone, regenerating the withdrawn catalyst particles by burning carbonaceous deposits therefrom at elevated temperatures in a separate regeneration zone, withdrawing a second or recycle stream of catalyst from the reaction zone, withdrawing a stream of regenerated catalyst particles from the regeneration zone, mixing the stream of regenerated catalyst particles substantially at regenerator temperature with the second stream of reactor catalyst substantially at reactor temperature, treating the freshly regenerated catalyst in admixture with the recycle reactor catalyst with a hydrogen-rich gas in order to reduce the molybdic oxide on the regenerated catalyst particles to a lower, more catalytically active form of molybdenum oxide, disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

2. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight ratios of about 0.5 to 1.5, the improvement which comprises continuously withdrawing a stream of catalyst particles from a reaction zone, stripping entrained and adsorbed hydrogen and hydrocarbons from the withdrawn catalyst, regenerating the stripped catalyst particles by burning carbonaceous deposits therefrom at elevated temperatures in a separate regeneration zone, withdrawing a second or recycle stream of catalyst from the reaction zone, withdrawing a stream of regenerated catalyst particles from the regeneration zone, stripping carbon oxides and oxygen from the regenerated catalyst particles, mixing the stripped regenerated catalyst particles substantially at regenerator temperature with the second stream of reactor catalyst substantially at reactor temperature, treating the freshly regenerated catalyst in admixture with the recycle reactor catalyst with a hydrogen-rich gas in order to reduce the molybdic oxide on the regenerated catalyst particles to a lower, more catalytically active form of molybdenum oxide, disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

3. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight ratios of about 0.5 to 1.5, the improvement which comprises continuously withdrawing a stream of catalyst particles from a reaction zone, regenerating the withdrawn catalyst particles by burning carbonaceous deposits therefrom at elevated temperatures in a separate regeneration zone, withdrawing a second or recycle stream of catalyst from the reaction zone at temperatures of about 850°–950° F., withdrawing a stream of regenerated catalyst particles from the regeneration zone at temperatures of about 1050°–1300° F., mixing the stream of regenerated catalyst particles with the second stream of reactor catalyst, treating the freshly regenerated catalyst in admixture with the recycle reactor catalyst with a hydrogen-rich gas in order to reduce the molybdic oxide on the regenerated catalyst particles to a lower, more catalytically active form of molybdenum oxide disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

4. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight rations of about 0.5 to 1.5, the improvement which comprises continuously withdrawing a stream of catalyst particles from a reaction zone, stripping entrained and adsorbed hydrogen and hydrocarbons from the withdrawn catalyst, regenerating the stripped catalyst particles by burning carbonaceous deposits therefrom at elevated temperatures in a separate regeneration zone, withdrawing a second or recycle stream of catalyst from the reaction zone at temperatures of about 850°–950° F., withdrawing a stream of regenerated catalyst particles from the regeneration zone at temperatures of about 1050°–1300° F., stripping carbon oxides and oxygen from the regenerated catalyst particles, mixing the stripped regenerated catalyst particles with the second stream of reactor catalyst, treating the freshly regenerated catalyst in admixture with the recycle reactor catalyst with a hydrogen-rich gas in order to reduce the molybdic oxide on the regenerated catalyst particles to a lower, more catalytically active form of molybdenum oxide, disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

5. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight ratios of about 0.5 to 1.5, the improvement which comprises continuously withdrawing a stream of catalyst particles from a reaction zone, regenerating the withdrawn catalyst particles by burning carbonaceous deposits therefrom at elevated temperatures in a separate regeneration zone, withdrawing a second or recycle stream of catalyst from the reaction zone at temperatures of about 850°–950° F., withdrawing a stream of regenerated catalyst particles from the regeneration zone at temperatures of about 1050°–1300° F., mixing the stream of regenerated catalyst particles with the second stream of reactor catalyst, treating the freshly regenerated catalyst in admixture with the recycle reactor catalyst at temperatures below about 1050° F. with a hydrogen-rich gas in order to reduce the molybdic oxide on the regenerated catalyst particles to a lower, more catalytically active form of molybdenum oxide, disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

6. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight ratios of about 0.5 to 1.5, the improvement which comprises continuously withdrawing a stream of catalyst particles from a reaction zone, stripping entrained and adsorbed hydrogen and hydrocarbons from the withdrawn catalyst, regenerating the stripped catalyst particles by burning carbonaceous deposits therefrom at elevated temperatures in a separate regeneration zone, withdrawing a second or recycle stream of catalyst from the reaction zone at temperatures of about 850°–950° F., withdrawing a stream of regenerated catalyst particles from the regeneration zone at temperatures of about 1050°–1300° F., stripping carbon oxides and oxygen from the regenerated catalyst particles, mixing the stripped regenerated catalyst particles with the second stream of reactor catalyst, treating the freshly regenerated catalyst in admixture with the recycle reactor catalyst at temperatures below about 1050° F. with a hydrogen-rich gas in order to reduce the molybdic oxide on the regenerated catalyst particles to a lower, more catalytically active form of molybdenum oxide disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

7. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of between about 50 and 500 lbs. per sq. inch and at catalyst to oil weight ratios of about 0.5 to 1.5, the improvement which comprises continuously withdrawing a stream of catalyst particles from a reaction zone, regenerating the withdrawn catalyst particles by burning carbonaceous deposits therefrom at elevated temperatures in a separate regeneration zone, withdrawing a second or recycle stream of catalyst from the reaction zone at temperatures of about 850° F.–950° F., withdrawing a stream of regenerated catalyst particles from the regeneration zone at temperatures of about 1050°–1300° F., mixing the stream of regenerated catalyst particles with the second stream of reactor catalyst, treating the freshly regenerated catalyst in admixture with the recycle reactor catalyst at temperatures below about 1050° F. with a hydrogen-rich gas for a period of from about 2 seconds to about 15 minutes in order to reduce the molybdic oxide on the regenerated catalyst particles to a lower, more catalytically active form of molybdenum oxide, disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

8. In a process for hydroforming hydrocarbons in contact with finely divided hydroforming catalyst particles comprising molybdenum oxide upon an alumina-containing support in accordance with the fluidized solids technique at temperatures between about 850° F. and 950° F., at pressures of about 50 and 500 lbs. per sq. inch and at catalyst to oil weight ratios of about 0.5 to 1.5, the improvement which comprises continuously withdrawing a stream of catalyst particles from a reaction zone, stripping entrained and adsorbed hydrogen and hydrocarbons from the withdrawn catalyst, regenerating the stripped catalyst particles by burning carbonaceous deposits therefrom at elevated temperatures in a separate regeneration zone, withdrawing a second or recycle stream of catalyst from the reaction zone at temperatures of about 850°–950° F., withdrawing a stream of regenerated catalyst particles from the regeneration zone at temperatures of about 1050°–1300° F., stripping carbon oxides and oxygen from the regenerated catalyst particles, mixing the stripped regenerated catalyst particles with the second stream of reactor catalyst, treating the freshly regenerated catalyst in admixture with the recycle reactor catalyst at temperatures below about 1050° F. with a hydrogen-rich gas for a period of from about 2 seconds to about 15 minutes in order to reduce the molybdic oxide on the regenerated catalyst particles to a lower, more catalytically active form of molybdenum oxide, disengaging the catalyst particles from the hydrogen-rich pretreating gas and vapors formed in the hydrogen treatment of the regenerated catalyst, discharging the gases from the pretreating operation into the product vapors withdrawn from the reaction zone and discharging the hydrogen treated catalyst mixture substantially free of pretreating gas and gaseous by-products of the pretreatment step into the reactor dense bed thereby avoiding contact of the water vapor formed as a by-product in the pretreatment step with the dense bed of catalyst in the reaction zone.

References Cited in the file of this patent

UNITED STATES PATENTS

| | | |
|---|---|---|
| 2,345,487 | Liedholm | Mar. 28, 1944 |
| 2,410,891 | Meinert et al. | Nov. 12, 1946 |
| 2,459,824 | Leffer | Jan. 25, 1949 |
| 2,472,844 | Munday et al. | June 14, 1949 |
| 2,490,993 | Borcherding | Dec. 13, 1949 |
| 2,700,639 | Weikart | Jan. 25, 1955 |